E. J. DONDLINGER.
VEHICLE BODY HOIST.
APPLICATION FILED DEC. 7, 1921.

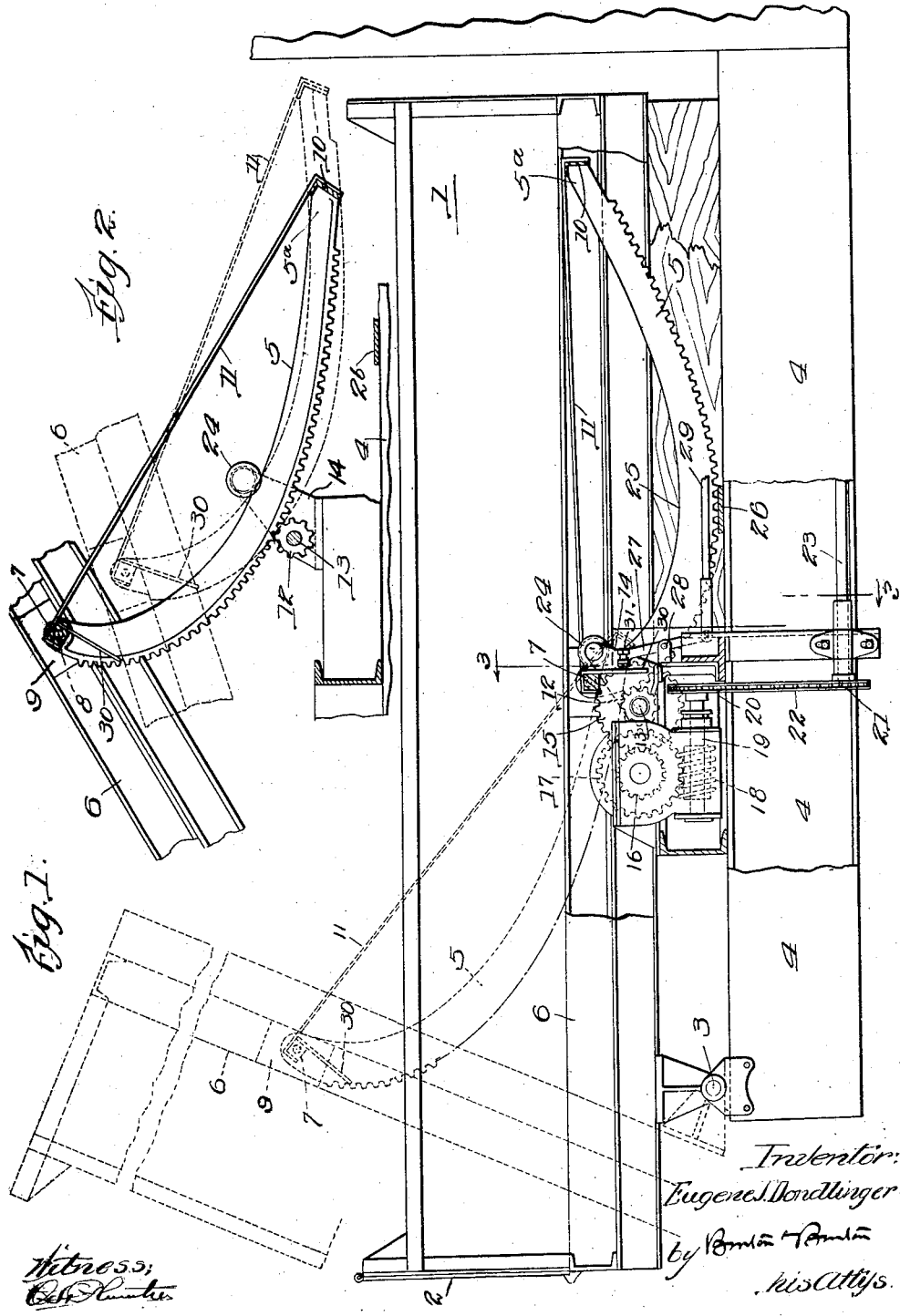

1,432,389.

Patented Oct. 17, 1922.
3 SHEETS—SHEET 2.

Inventor;
Eugene J. Dondlinger,
by Burton & Burton
his Attys.

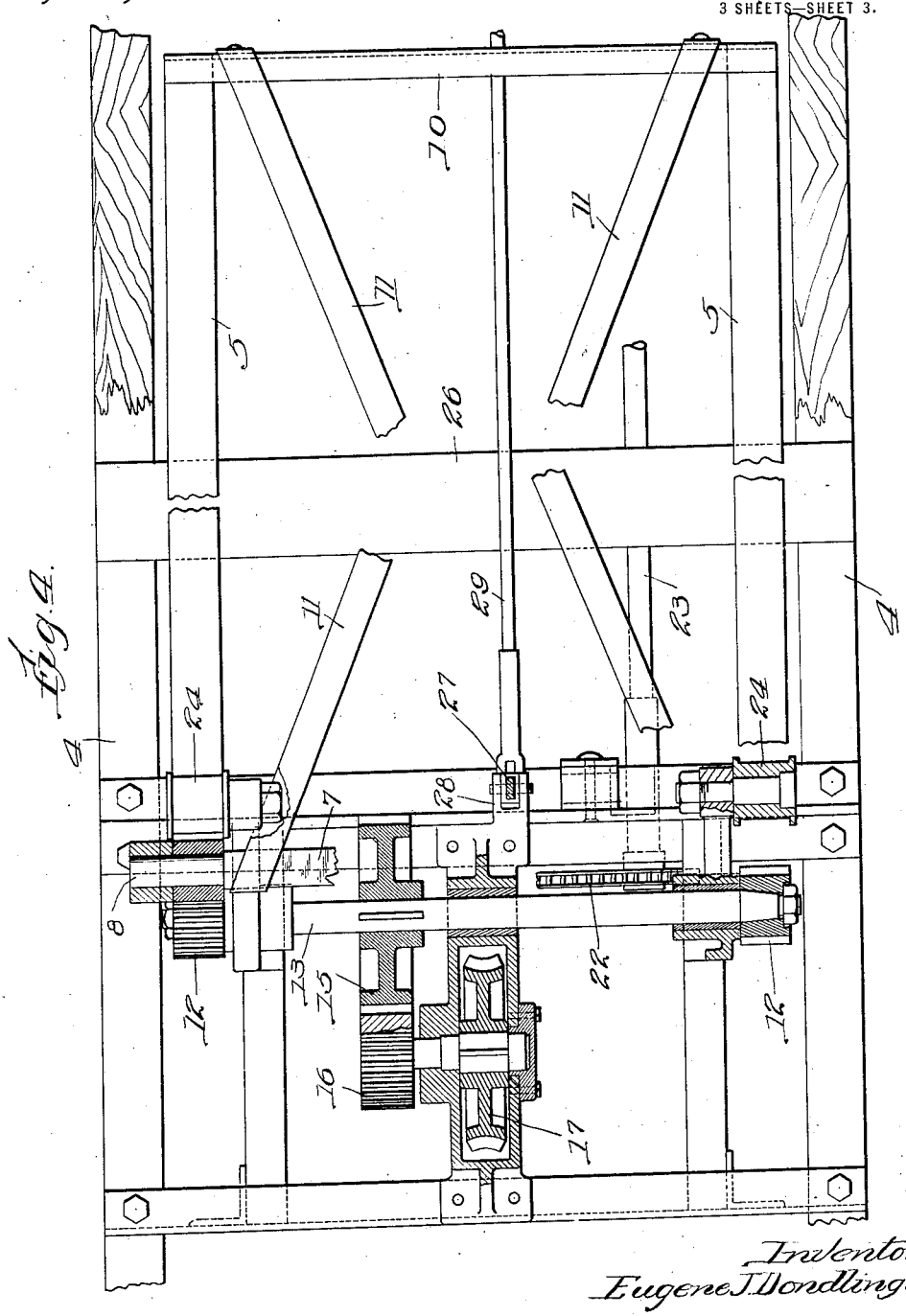

Patented Oct. 17, 1922.

1,432,389

UNITED STATES PATENT OFFICE.

EUGENE J. DONDLINGER, OF EDGERTON, WISCONSIN, ASSIGNOR TO CONTINENTAL AXLE COMPANY, OF EDGERTON, WISCONSIN, A CORPORATION OF WISCONSIN.

VEHICLE BODY HOIST.

Application filed December 7, 1921. Serial No. 520,479.

*To all whom it may concern:*

Be it known that I, EUGENE J. DONDLINGER, a citizen of the United States, residing at Edgerton, in the county of Rock and State of Wisconsin, have invented certain new and useful Improvements in Vehicle Body Hoists, of which the following is a specification, reference being had to the accompanying drawings, forming a part thereof.

The purpose of this invention is to provide a lifting or hoisting mechanism for tilting the box or body of a vehicle in discharging its load and the invention is particularly concerned with securing a compact arrangement of the mechanism in disposing it upon the vehicle frame. It consists of certain features and elements of construction and their combination hereinafter described and shown in the drawings as indicated by the claims.

In the drawings:—

Figure 1 is a partial side elevation of a motor truck frame with a tilting dump body and hoisting mechanism associated therewith, showing in dotted lines the extreme discharge position of the body and certain parts of the hoist.

Figure 2 is a fragmental side elevation of the rack and driving pinion of the hoist showing in full lines and in dotted lines two respective positions of the parts between the extreme limits of adjustment.

Figure 4 is a top plan view with parts in section showing the gear-train and working parts of the hoist mechanism.

Figure 3:
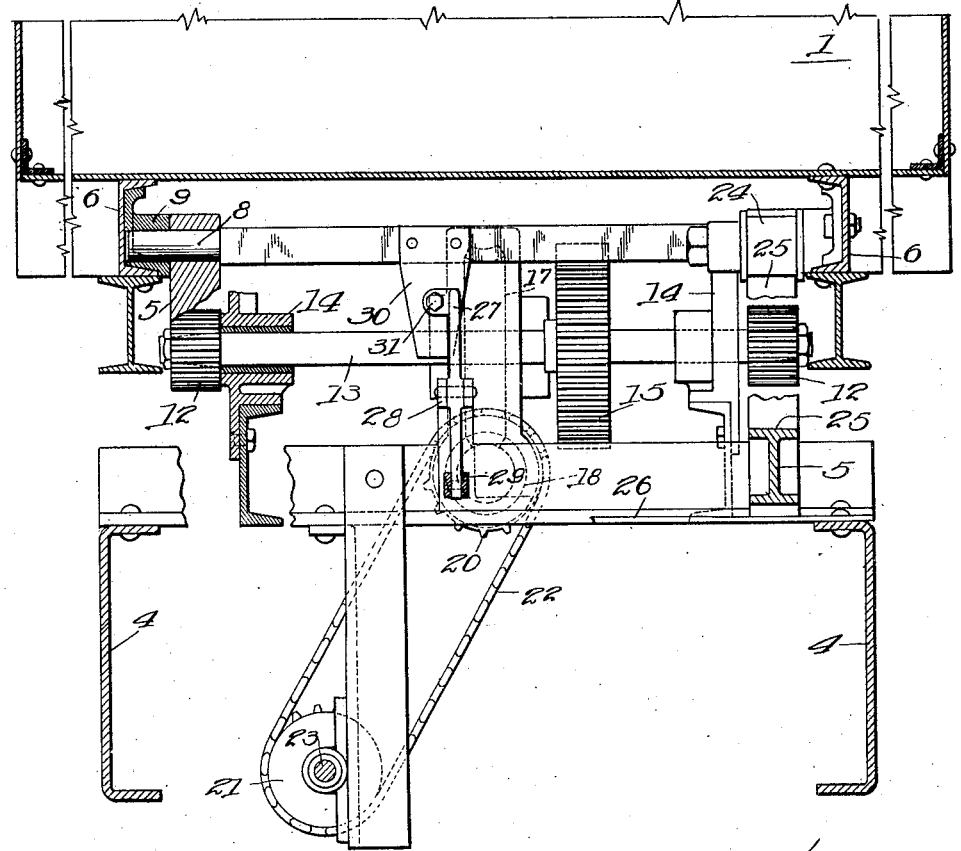
Figure 3 is a transverse section taken as indicated at line 3—3 on Figure 1.

For purposes of illustration the box or body, 1, may be understood as having a swinging tail gate at 2, so that when the body is tilted upward about its fulcrum bearing, 3, on the frame, 4, its load will discharge by sliding along the floor of the box and past the tail gate, 2. The present invention relates to means for swinging or tilting the body to an inclined position to accomplish such discharge and then returning it to normal horizontal load-receiving position as shown in full lines in Figure 1. This means consists primarily of a pair of rack bars, 5, which are hinged to the under frame, 6, of the body, 1, by connection of their end portions to a cross bar, 7, having trunnions, 8, at its ends journaled in bearing blocks, 9, which are secured to the side members of the frame, 6. The two rack bars, 5, are also transversely connected at their opposite or free ends by a cross member, 10, while diagonal straps, 11, serve to reinforce this assembly so that it will act as a unit.

Each of the racks, 5, meshes with one of the pinions, 12, secured to opposite ends of a shaft, 13, journaled transversely of the vehicle in brackets, 14, fixed to the frame 4. The shaft, 13, carries a gear, 15, meshing with a pinion, 16, rigidly associated with a larger gear 17, which meshes with a worm, 18, on the countershaft, 19, said shaft being driven by sprocket wheels, 20 and 21, and the chain, 22. The sprocket wheel, 21, is fixed to a drive shaft, 23, which may extend into operative connection with any available element of the vehicle transmission or power plant when the hoist is applied to a motor truck. If the vehicle is horse-drawn it will be obvious that the shaft, 23, may be supplied with any suitable gearing for manual operation.

In addition to the shaft, 13, there are journaled in the brackets, 14, a pair of rollers, 24, which respectively engage the back faces or edges, 25, of the racks, 5, for holding the latter properly in mesh with pinions, 12, throughout the range of adjustment of the hoist mechanism; since the guide rollers 24 are located in fixed relation to the pinions 12, this requires the racks 5 to be of graduated thickness from end to end so that they will properly fit between the pinions and the guide rollers throughout their varying angular relation to the frame when the body is tilted upon its fulcrum bearing 3. As seen in Figure 1, the trunnions, 8, by which the racks are hinged to the body, 1, are normally near the axis of the shaft, 13, when the body was lowered into horizontal position. If the rack bars, 5, were straight, it is evident that as the body is swung upward on its fulcrum bearings, 3, the free ends of the racks would be pointed downwardly past the vehicle frame members, 4; in many cases this would embarrass the handling of the truck over rough ground with the body tilted in partially elevated position, or the cross connection, 10, between the racks would be likely to collide with the propeller drive shaft of the truck or other mechanism located between the frame members, 4. To avoid these difficulties, the rack bars, 5, are curved as shown in the drawings, so that they are upwardly concave, their free ends, 5ª, extending up toward the bottom of the box or body, 1, when the latter lies in normal horizontal position. The curvature of the bars, 5, is so graduated from end to end that as they are fed over the pinions, 12, the outline of the racks travels in a path wholly above the frame 4 throughout the hoisting range. The frame members, 4, are supplied with a cross strap, 26, which extends directly under the lowest portions of the rack bars, 5, when the body is in lowered position and thus assumes a part of their weight so that it will not impose an undue crowding strain upon the pinions, 12, in this position of the parts. As the rack bars, 5, are advanced over the pinions, 12, they simultaneously rise away from the cross strap, 26, as indicated in both dotted and full line positions shown in Figure 2; at the upper limit of the hoisting range, as the end portions, 5ª, approach the pinions, 12, the cross tie, 10, will engage the upper end of the trip lever, 27, fulcrumed in a bracket, 28, and connected by a rod, 29, with any suitable clutch device through which the shaft, 23, is driven. This movement of the trip lever, 27, to "neutral" position may be arranged to disengage such clutch device (not shown) so as to stop the motion of the shaft, 13, and pinions, 12. By virtue of the use of the worm, 18, in this drive train the parts will be locked when the power is disconnected and the body, 1, will be held in tilted position.

For returning the body, 1, to its normal load-receiving position the trip lever, 27, for the rod, 29, may be manually moved in the same direction as it was moved by the cross bar, 10, but into a further limiting position in which it connects the shaft, 23, with any suitable reverse drive gearing for operating the pinions, 12, in a direction to feed the rack bars, 5, forwardly and lower the body, 1. As the parts approach their lower limit, a trip plate, 30, carried by the cross bar, 7, will encounter the trip lever, 27, and again throw it to neutral position for disconnecting the drive shaft, 23, from the power plant and arresting the movement of the parts. If desired the trip lever, 27, may be provided with an adjusting screw, 31, for determining accurately the point at which this encounter with the plate, 30, shall take place.

The curvature of the rack bars, 5, not only prevents them from traveling below the vehicle frame, 4, in the hoisting action, but by shifting the point of engagement of the rack teeth with the teeth of the pinions, 12, it keeps the line of pressure between these teeth directed almost at right angles to the bottom of the body, 6, throughout the hoisting range; in other words, the rack bars are so curved that each of the gear pinions 12 coacts with its rack 5 along a line approximately parallel to the tangent of the curve through which the trunnions 8 which form the hinge between the racks and the body are caused to travel as the body is tilted about its fulcrum 3. The turning effort of the shaft, 13, and its pinions, 12, being thus transformed into a thrust whose direction is varied as the body rises, is efficiently utilized in the actual hoisting work.

I claim:—

1. In combination with a vehicle frame and a body fulcrumed thereon for tilting to discharge its load, a hoist comprising a gear journaled on the frame and a rack bar hinged to the body to mesh with said gear and extending from its hinge toward the end of the body remote from the fulcrum, said rack bar being so curved that throughout the hoisting range the gear will coact with the rack along a line approximately parallel to the direction of travel of the hinge axis on the tilting body.

2. In combination with a vehicle frame and a body fulcrumed thereon, a hoist comprising a gear journaled on the frame and a rack bar of graduated curvature hinged to the body and meshing with the gear, together with a guide fixed on the frame opposite the gear, the rack bar being graduated in thickness from end to end to fit between the gear and the guide throughout its varying angular relation to the frame as the body is tilted upon its fulcrum.

3. In combination with a vehicle frame, a body fulcrumed thereon for tilting to discharge its load, and spaced above the frame, and a hoist comprising a rack bar hinged to the under side of the body and accommodated wholly between the frame and the body, and a gear journaled on the frame to mesh with said rack, the rack having a graduated curvature such that throughout the hoisting range, as the hinged end of the rack swings upward with the body, the entire outline of said rack travels in a path wholly above the vehicle frame.

4. In combination with a vehicle frame, a body fulcrumed thereon for tilting to discharge its load, and spaced above the frame, and a hoist comprising a pair of rack bars hinged to the under side of the body at a common transverse axis and transversely connected together to act as a unit, said rack bars being accommodated wholly between the frame and the body, a transverse shaft journaled on the frame and gears on the shaft positioned to mesh with the rack bars respectively, said racks being so curved that throughout the hoisting range, as their hinge axis swings upward about the body fulcrum, both racks travel in a path wholly above the frame.

5. In combination with a vehicle frame, a body fulcrumed thereon for tilting to discharge its load and spaced above the frame, and a hoist comprising a pair of rack bars hinged to the under side of the body at a common transverse axis with transverse members connecting them together to act as a unit, said rack bars trending from their hinge axis toward the end of the body remote from its fulcrum and being accommodated wholly within the space between the frame and the body, together with a transverse shaft journaled on the frame, and gears on the shaft positioned to mesh with the rack bars respectively, said racks being so curved that throughout the hoisting range, as their hinge axis swings upward with the body, the outline of the racks travels in a path wholly above the frame and the gears coact with the racks in a direction approximately parallel to the direction of travel of said hinge axis.

In testimony whereof, I have hereunto set my hand at Chicago, Illinois, this 3rd day of December, 1921.

EUGENE J. DONDLINGER.